Nov. 10, 1970   L. C. CLARK, JR   3,539,455
MEMBRANE POLAROGRAPHIC ELECTRODE SYSTEM AND METHOD WITH
ELECTROCHEMICAL COMPENSATION
Filed Oct. 8, 1965   2 Sheets-Sheet 1
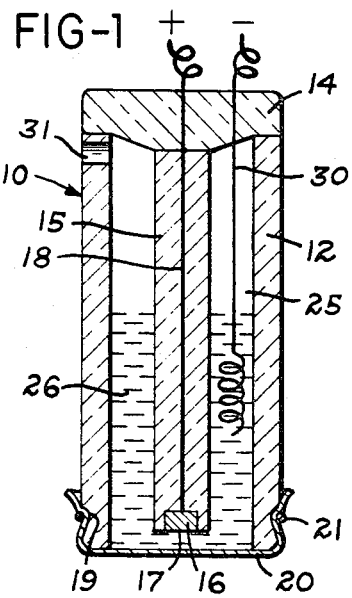
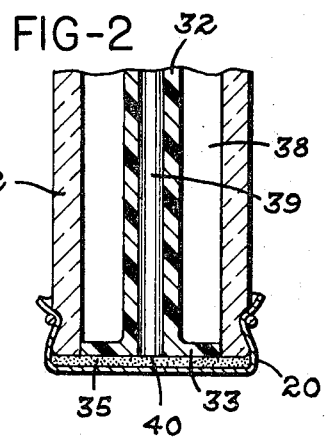
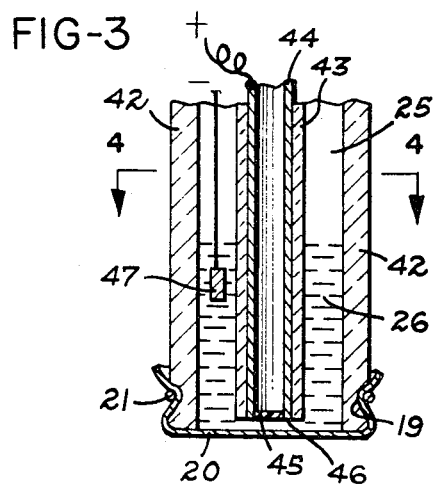
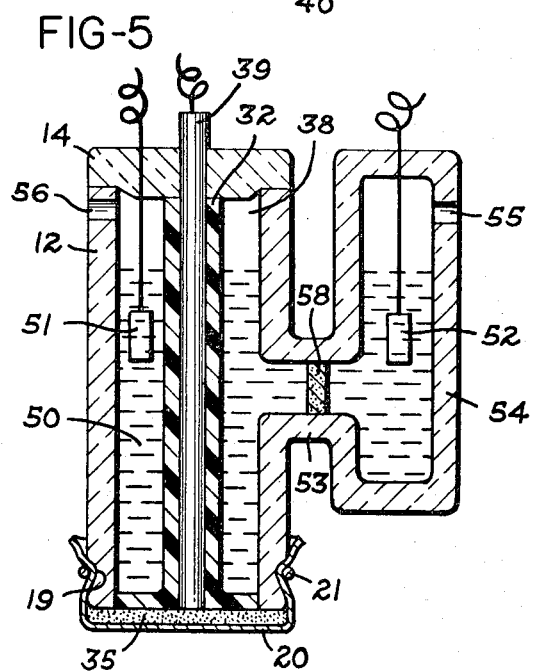
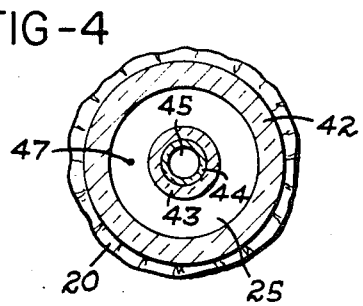
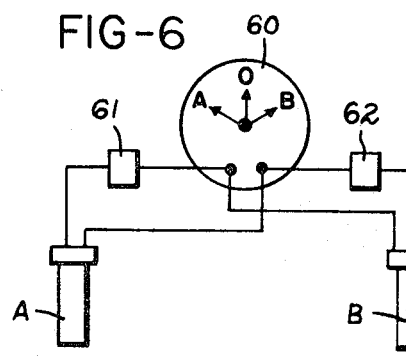
INVENTOR.
LELAND C. CLARK, JR.
BY
Marechal, Biebel, French & Bugg
ATTORNEYS

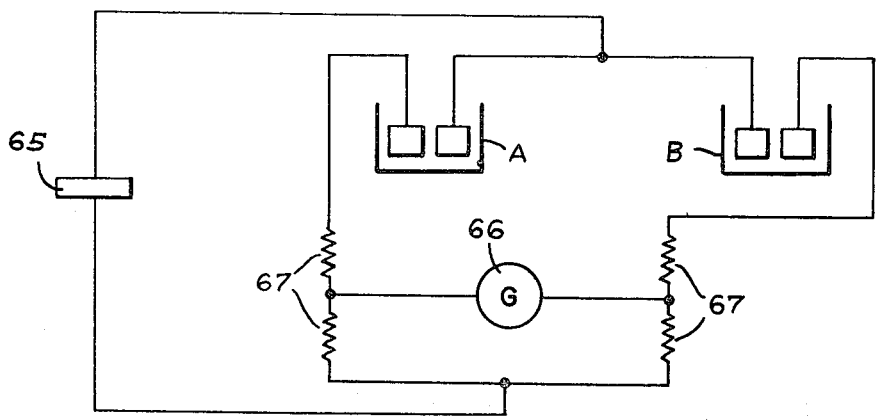
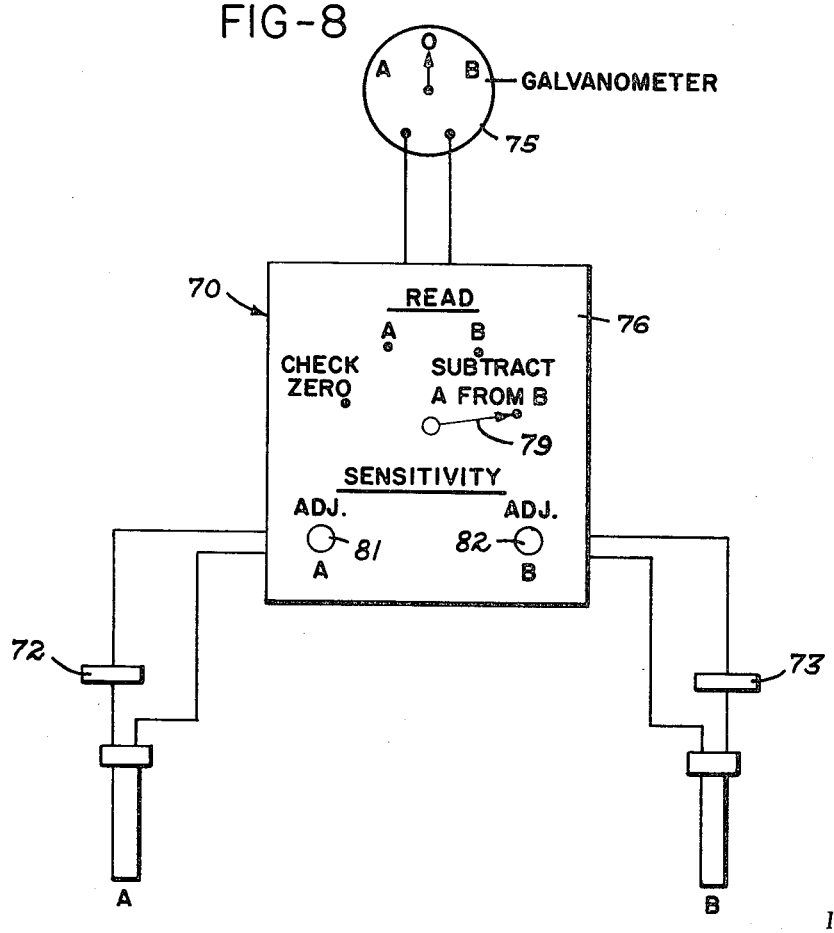

United States Patent Office 3,539,455
Patented Nov. 10, 1970

3,539,455
MEMBRANE POLAROGRAPHIC ELECTRODE SYSTEM AND METHOD WITH ELECTROCHEMICAL COMPENSATION
Leland C. Clark, Jr., Birmingham, Ala.
(346 Compton Hills Drive, Cincinnati, Ohio 45215)
Filed Oct. 8, 1965, Ser. No. 494,215
Int. Cl. G01n 27/46, 27/54
U.S. Cl. 204—1                     35 Claims

ABSTRACT OF THE DISCLOSURE

A polarographic device for measurement of polarographically inactive material includes one or more enzymes for converting the inactive material to one which is polarographicaly active, for example, glucose oxidase converts glucose to gluconic acid and hydrogen peroxide, the latter detected polarographically. In cases where the unknown contains interfering materials a current is produced representative of both the interfering material and the converted product, and a compensation system provides a current representative of only the interfering material. By subtracting the one current from the other, a current is provided which is representative of the converted product and thus the polarographic inactive unknown. Various methods and electrode systems are also described.

---

This invention relates to an electrochemical device, and more particularly to an improved compensated polarographic cell for making accurate quantitative or qualitative analyses of substances.

Polarographic electrode systems have been used to measure various materials qualitatively and quantitatively, and reference is made to my earlier Pat. 2,913,386, issued Nov. 17,1959, describing a polarographic electrode system for the measurement of oxygen and the like. Reference is also made to my copending application Ser. No. 315,461, filed Oct. 11, 1963, now U.S. Pat. No. 3,380,905, which deals with an improvement of the polarographic electrode system described in the above mentioned patent.

The speed wtih which polarographic determinations are made represents a unique advantage in qualitative and quantitative determinations of various materials. As is well known, the accuracy of a polarographic cell for quantitative and qualitative determinations depends upon the interrelation of the electrodes constituting the cell, the electrolyte, and to a great extent the substance being tested. The use of a polarographic cell as a universal instrument of chemical analysis is complicated by the fact that the presence of interfering substances may provide an erroneous electrical indication which represents the sum of the current attributable to the material being measured, or which is sought to be identified, and the presence of interfering amounts of other materials which adversely affect the electrical characteristics of the electrode or electrolyte system. Obviously, in analyzing an unknown material for the presence or for the amount of one of several constituents, the accuracy of the cell may be adversely affected by materials which inherently interfere with the electrical measurement, i.e., provide a false current reading, and whose presence in the sample being tested is unknown to the analyst.

One of the more difficult groups of materials to analyze directly by polarographic methods are carbohydrates of the following types:

(1) Simple sugars—monosaccharides which do not hydrolyze to form other sugars, (2) Oligosaccharides which upon hydrolysis yield monosaccharides. Included in this group are the reducing and nonreducing disaccharides. Also included under the group of oligosaccharides are the tri, tetra, penta and hexasaccharides which yield monosaccharides when hydrolyzed.

(3) Polysaccharides, or those carbohydrates that yield a relatively large number of molecules or monosaccharides when hydrolyzed.

The difficulty of analyzing the above materials directly by polarographic methods stems from the fact that these materials per se are not polarographically active and thus no measurable current flows when analyzed by conventional polarographic cells.

It is of course highly desirable to be able to analyze various materials for the quantitative presence of one or more of these carbohydrates by lightweight automated equipment. For example in medicine, rapid chemical measurement of glucose would be highly desirable because glucose plays a major roll in the metabolism of the body in health and in disease. There are, for example, instances in which it is vital to determine rapidly and accurately whether a patient is unconscious because of hypoglycema or because of a brain injury. There are many times when in "screening" populations it is economical and efficient to learn at once if a patient has a tendency towards diabetes.

Present reliable and accurate quantitative chemical measurements for glucose are somewhat tedious stepwise laboratory procedures requiring the skill of a laboratory technician or a chemist. Automated chemical analyses have the advantage of requiring less training or skill on the part of the laboratory worker but have the disadvantage that there is a delay, often more than fifteen minutes, between insertion of the sample and attainment of the result on an electonic meter or recorder. In large medical centers, where hundreds of blood samples are analyzed daily for glucose content many precautions are followed to prevent the various samples from being confused or mixed during collection, placement in sample cups for insertion in a machine, reading of the chart record of the machine, and reporting of the results. Due to complexity, size, and cost, such equipment or such glucose laboratories must be centrally located. In accordance with the present invention, a simpler improved device is provided which may be made available in a number of places in a hospital and the blood may be withdrawn from the patient, immediately injected into the instrument, and the results read on a meter.

In controlling certain types of diabetic patients (persons whose blood sugar tends to rise due to lack of insulin) it is desirable to have a device which continuously and without delay senses their blood glucose so that the injection of insulin or glucose can be regulated in an electronically controlled feed-back system. Such instruments are not entirely practical at present because the long lag between the change in the blood composition and the sensing of the change causes the instrument to wander.

In accordance with the present invention, a polarographic apparatus is provided for the rapid and accurate quantitative analysis of substances in solution or gel form. In its simplest form the cell of the present invention consists of an anode and a cathode separated physically but in electrical contact with each other through an electrically conductive material so constructed and arranged as to provide ions for conducting the current and other chemicals to bring about a desired reaction. In those cases where other polarographically active material may be present in the solution to be analyzed, provision is made to compensate for the other polarographically active material and the current from a control or compensating electrode or cell is subtracted, either electrically or otherwise, from the total current to provide a current proportional to the amount of polarographically active material being analyzed.

A feature of the present invention is the coordination and correlation of specific enzyme systems in combination with the cell whereby the cell is rendered sensitive to certain substances and wherein the cell compensates for the possible effect of other substances which tend to interfere or produce erroneous electrical indications.

Another aspect of the present invention is a compensation system for a polarographic cell by which the voltage between one electrode and another electrode or electrode pair is so coordinated that the cell system provides a current proportional both to the interfering material and the material to be analyzed and a second current only for the interfering material so that the two currents may be subtracted electrically or otherwise to provide a current reading for both the interfering material and that sought by the analysis.

Cells are known in which enzymes are held between two membranes for the purpose of converting the material to be tested into another substance as it passes through the enzyme sandwich. The enzyme sandwich or transducer membrane offers the disadvantage of being limited in the amount of enzyme and the like which can be held in the sandwich while still maintaining the membrane sufficiently thin to be of practical use. Additionally, the preparation of uniformly dimensioned enzyme sandwiches or transducers including two membranes is quite difficult, and the variation in spacing may adversely affect the accuracy of the polarographic cell. This type cell does not include provision for a compensation current and therefore may under certain circumstances, provide an erroneous indication.

The present system differs in simplicity, reliability and in function from the cell disclosed in my article appearing in "Annals of the New York Academy of Sciences," volume 102, article 1, pages 29 to 45 of Oct. 31, 1962. In the system described in this article, the active electrode is the cathode because oxygen is being measured and the cell described therein does not include a polarographic anode. My subsequent investigation also indicates that under the conditions therein described, the measurement of pH or $pO_2$ may not be reliable as an indication of the presence or quantity of an unknown because of variations in the membrane cell system as will be described more fully herein.

Accordingly, it is a primary object of the present invention to provide an improved compensated polarographic apparatus for rapid and accurate polarographic analysis.

Another object of the present invention is the provision of an improved polarographic cell system for the quantitative determination of a constituent in a mixture containing interfering amounts of other substance and wherein the cell system is selectively sensitive to the constituent to be measured plus the interfering substance and to the interfering substance only so as to produce two separate currents, and wherein the amount of the constituent to be measured may be determined by electrically or otherwise subtracting the interfering current from the total current.

Another object of the present invention is the provision of a polarographic apparatus including an improved polarographic cell system for the accurate and rapid quantitative determination of an unknown by the use of two cells one of which contains an enzyme and the other of which does not.

Still another object of the present invention is the provision of improved polarographic cells for the quantitative determination of a carbohydrate by conversion to a polarographically active material.

Another object of the present invention is the provision of a polarographic cell wherein the electrode pair is responsive at one voltage to the material being measured and responsive at another voltage to both the material being measured and interfering materials so that the respective currents produced at the respective voltages may be subtracted electrically or otherwise to provide an indication of the amount or presence of an unknown.

Another object of the present invention is the provision of an improved polarographic cell utilizing a pyrolytic graphite electrode.

Another object of the present invention is to provide an improved polarographic cell when at least one electrode is palladium.

Another object of the present invention is an improved method for the accurate and rapid quantitative determination of a particular polarographically inert material by the enzymatic conversion thereof to a polarographically active material, and wherein the method may include the step of electrically or otherwise compensating for the presence of interfering amounts of other materials.

Other objects and advantages of the present invention will be apparent from the following description, the accompanying drawings and the appended claims.

In the drawings

FIG. 1 is a view partly in section and partly in elevation of the improved polarographic cell of the present invention;

FIG. 2 is a sectional view of an electrode structure in accordance with the present invention for use in a polarographic cell;

FIG. 3 is a sectional view of another form of polarographic cell in accordance with the present invention;

FIG. 4 is a sectional view taken along the line 3—3 of FIG. 4;

FIG. 5 is a view in section of a modified form of electrode structure shown in FIG. 2;

FIG. 6 is a schematic illustration of an electrical circuit for use with the cell of the present invention for compensated polarographic analysis in accordance with the present invention;

FIG. 7 is another schematic of an electrical circuit for use in polarographic analysis in accordance with the present invention; and FIG. 8 is a schematic showing of the overall arrangement of a compensated polarographic cell system and indicating meter in accordance with the present invention.

The principles of the present invention may be more fully understood with reference to the analysis of blood for glucose content. Blood consists of glucose, a desmolyzing enzyme catalase, ascorbic acid (vitamin C) and various salts made up of cations of sodium potassium, magnesium, calcium, iron and copper, and anions such as chlorides, phosphates, bicarbonates, and carbonates and other substances. The phosphates, carbonates and bicarbonates operate as buffers to maintain the pH of blood at a fixed level under normal conditions. If a sample of blood were placed on one side of a membrane cell using a cellophane membrane, with an aqueous solution of the enzyme glucose oxidase and oxygen on the other side of the membrane, the low molecular weight materials will pass from the blood through the membrane to the glucose oxidase solution. The high molecular weight materials such as the enzymes will not pass through the membrane. The rate of permeability of the various materials through the membrane are fixed because of the nature of the membrane.

Glucose, a low molecular weight material will pass through the membrane and react with the enzyme glucose oxidase in the presence of oxygen to form gluconolactone and hydrogen peroxide. Gluconolactone in the presence of water will hydrolyze spontaneously to form gluconic acid and for all practical purposes the reaction is $$\text{Glucose} + O_2 \xrightarrow{\text{Glucose oxidase}} \text{Gluconic acid} + H_2O_2$$

Gluconic acid and hydrogen peroxide being relatively low molecular weight materials compared to the enzymes glucose oxidase and catalase will pass through the membrane. Catalaes and perioxidases which are large enzyme molecules capable of rapidly destroying $H_2O_2$ and which are present in biochemical fluids are retained on the side of the membrane opposite the $H_2O_2$ product. The formation of gluconic acid on the enzyme side of the cell reduces the pH, i.e., the solution becomes more acid and at the same time migrates through the membrane to affect the pH of the solution on the blood side of the cell by reducing the pH. Even though some buffer materials are present, a portion thereof has passed through the membrane into the enzyme solution and thus the blood sample is more susceptible to pH changes due to the increase in gluconic acid. These changes are most noticeable in the immediate vicinity of the membrane itself. After a certain period of time a steady state is reached when the $H_2O_2$ concentration on one side of the cell is directly proportional to the glucose concentration on the other side of the membrane. The time to reach this steady state is reduced by reducing the volume of the respective fluids on each side of the membrane.

While the glucose could then be detected by measuring the rate at which oxygen was consumed or the pH dropped in the enzyme solution due to the generation of the gluconic acid, it is difficult to regulate the amount of oxygen initially present, to calculate a rate, and in the second case to measure the pH change in the presence of solutions which have variable buffer (pH controlling) capacities. The peroxide end product, on the other hand, is not present at all if no glucose is present in the blood, and the amount of hydrogen peroxide increases in concentration as the glucose concentration increases as long as an excess of enzyme is available in the enzyme portion of the cell.

The present invention utilizes a compensated polarographic cell whose specificity in detecting the presence of an unknown or the amount thereof is related primarily to the enzymatic conversion of a material to a polarographically detectable material. Referring to the above illustration for the detection of the amount of glucose in blood, the electrode cell system uses an anode to detect the presence of hydrogen peroxide generated when glucose diffuses through the membrane and reacts in the presence of the enzyme glucose oxidase to form gluconic acid and hydrogen peroxide. The presence of other closely related sugars will not produce hydrogen peroxide since glucose oxidase is fairly specific in reactivity and only a very few substances are acted on by the enzyme glucose oxidase. Thus, the cell produces an increase in current flow only when glucose is present by detecting the hydrogen peroxide reaction product. When other substances which cause a current flow are present for example, ascorbic acid; a polarographic cell filled with a similar electrolyte but lacking the glucose oxidase is used to compensate for this nonglucose material. Oxygen is required for the enzyme to function, and in order to obtain an electric current proportional to the glucose in the solution being analyzed, changes in pH produced by the generation of the gluconic acid are prevented by use of suitable buffers and the temperature of the cell is controlled, or compensated. The electrode cell may be used to measure other substances which generate hydrogen peroxide directly or through a series of reactions, for example, the materials previously described.

Hydrogen peroxide readily depolarizes the polarographic anode and current flow, at a given applied voltage (usually about 0.9 volt), is proportional to the hydrogen peroxide concentration. If glucose were to be measured in blood by mixing the enzyme and the blood, no glucose would be detected because blood contains the enzyme, catalase, which destroys hydrogen peroxide at a very fast rate. This difficulty, and others, are circumvented in accordance with the present invention through the use of a cellulose or other membrane which is permeable to small molecules, such as glucose, but is impermeable to proteins. Cellophane, Cuprophane, dialysis tubing, certain natural and synthetic parchments and polymers are typical examples of this type of membrane. These membranes will not permit the passage of proteins, and all enzymes are proteins. The membrane serves to keep the glucose oxidase on the side of the membrane with the anode and at the same time to keep other enzymes, some of which, such as catalase, would ruin the reaction, on the other side of the membrane. In this way the catalase in the blood does not destroy the peroxide liberated by the glucose oxidase in front of its surface. Glucose has a molecular weight of 180 and can freely diffuse through the membrane while glucose oxidase has a molecular weight of 154,000 and cannot pass through the membrane. The product of the reaction, hydrogen peroxide, has a low molecular weight, only 34, but by virtue of the design of the present invention is formed directly on the platinum electrode surface where it is detected, and in the process of being detected is, in part at least converted to $H_2O$ and oxygen. While some of the oxygen may diffuse away from the platinum surface, this is not important because calibration of the electrode does not depend upon calculating the stoichiometric amount of peroxide formed since this may be done with standard glucose solutions. Additionally the anode is insensitive to oxygen.

The electrode may be standardized with glucose solutions prepared in buffer solutions, or even with blood containing known amounts of glucose. The glucose standardization solution is preferably prepared in a buffer solution, or at least in a solution containing salts because the solution must have electrical conductivity. The standard solutions also should contain oxygen, easily done by saturating them by bubbling with air or storing them in plastic bottles which permit permeation of air or oxygen through the plastic wall. Most of the natural materials, such as blood, normally under the most severe conditions contain oxygen.

The invention also makes possible the analysis of solutions for other substances which are acted upon by enzymes to yield hydrogen peroxide or other polarographically active substances. For example, it may be used to measure ascorbic acid (Vitamin C) by using the enzyme ascorbic acid oxidase (present, for example, in cucumber and squash juices) in the electrolyte compartment and measuring the free hydrogen peroxide generated. The following are typical reactions:

| | | |
|---|---|---|
| Ascorbic acid plus $O_2$ | Ascorbic acid oxidase | Dehydroascorbic acid plus $H_2O_2$. |
| l-amino acid plus $O_2$ | l-amino acid oxidase | Organic acid plus $H_2O_2$ plus $NH_3$. |
| d-Amino acid plus $O_2$ | d-Amino acid oxidase | Do. |
| Lactose plus $H_2O$ | Beta galactosidase | Galactose plus glucose. |
| Galactose plus $O_2$ | Galactoxidase | Galactose aldehyde plus $H_2O_2$. |
| Sucrose plus $H_2O$ | Invertase | Glucose plus fructose. |
| Raffinose plus $H_2O$ | do | Fructose plus Melibose. |
| Melibose plus $H_2O$ | Melibiase | Glucose plus galactose. |
| Xanthine plus $H_2O+O_2$ | Xanthine oxidase | Uric acid plus $H_2O_2$. |
| Uric acid plus $O_2$ plus $2H_2O$ | Uric acid oxidase | Allantoin plus $H_2O_2$ plus $CO_2$. |
| Tannin plus $H_2O$ | Tannase | Glucose plus digallic acid. |
| Maltose plus $H_2O$ | Maltase | Glucose. |
| Beta glucosides plus $H_2O$ | Beta glucosidase | Glucose plus non-sugar residue. |
| Cellobiose plus $H_2O$ | Cellobiase | Glucose. |
| Soluble starches plus $H_2O$ | Amylase | Dextrin and Maltose or maltase. |

NOTE.—Maltose reaction above to produce glucose.

In instances in which the enzymatic conversion results in the formation of glucose, the glucose may be converted enzymatically to hydrogen peroxide which is polarographically detectable. Accordingly great specificity may be obtained by utilizing the specificity of the enzyme.

Many enzymes consist of an apoenzyme which requires a coenzyme in order to function. In the case of dehydrogenases, this is particularly true and the coenzyme functions to accept hydrogen or an electron and to pass this on until oxygen can act as the acceptor. These coenzymes or prosthetic groups are generally of small molecular weight compared to the enzyme and thus tend to diffuse away. Accordingly, it is preferred in accordance with the present invention to use a coenzyme which is not labile and preferably one which will be bound to the enzyme to form a protein moiety so as to prevent diffusion of the coenzyme through the membrane. It is also possible in accordance with the present invention to add a coenzyme or diffusable enzyme activator, for example calcium ion, to the material being analyzed.

Referring to the drawings, which illustrate preferred embodiments of the polarographic cell structure in accordance with the present invention, FIG. 1 shows a cell assembly 10 which includes an electrically insulating support body 12 of plastic or glass which is preferably cylindrical and which is covered by an electrically insulating cap 14. Positioned within the cylindrical body 12 is an electrically insulating member or rod 15 of plastice or glass which supports a platinum electrode 16, the latter including an active or exposed face 17, and a conductor 18 attached to the electrode 16 and which passes through the rod 15 and through the cap 14.

The lower end of the support body 12 is provided with an annular groove or detent 19, and a membrane 20 is supported over the end of the supporting body nearest the electrode 16 and spaced a capillary distance from the active face 17. The membrane which is liquid permeable and passes only relatively low molecular weight materials is held in position on the supporting body by an O-ring 21 or the like.

An annular space 25 is provided between the rod 15 and the supporting body 12 and receives a reference electrode 30 which may for example be silver chloride coated silver wire. The space 25 is at least partly and preferably completely filled with a liquid mixture of electrolyte which contacts both electrodes 30 and 16 and which may be introduced into the chamber through an aperture 31 provided beneath the cap 14. If the cell is used to detect polarographically measurable materials and interfering materials the electrolyte also includes an enzyme but if it is used as the compensating electrode to detect the presence of interfering materials, the enzyme is omitted.

In polarographic measurements two electrodes are commonly used, one of which is polarized and does not allow current to flow until depolarized by a substance being measured. In the cell structure shown in FIG. 1, electrode 30 is the cathode and is polarized and frequently referred to as the reference electrode. The other electrode, electrode 16 as shown in FIG. 1, functions as an anode and is not polarized in the presence of the substance being measured and therefore will not restrict the flow of relatively large current and is frequently referred to as the sensor electrode. The electrodes as shown in FIG. 1 are in electrically insulating relation, and the electrolyte material which occupies the chamber 25 provides an electrical path between the two electrodes. Typical electrolytes include sodium or potassium chloride buffers including carbonate, phosphate, bicarbonate, acetates, or alkali or rare earth salts, or other organic buffers or mixtures thereof. The solvent for such electrolyte may be water, glycols, glycerine, and mixtures thereof.

The electrode structure shown in FIG. 2 includes the same cap structure shown in FIG. 1 but differs therefrom by including an oxygen permeable plastic tube 32 which includes a generally annular face section 33 spaced from the membrane 20 to define a small chamber 35 which is filled with a thin layer of enzyme and electrolyte. The outer peripheral edges of the face section 33 are in sealing engagement with the inner surface of the support body to prevent passage of the electrolyte into the annular space 38 between the support body 12 and and tube 32. The tube 32 may be of a material such as silicone plastic, fluorocarbon such as polytetrafluoroethylene, copolymer of tetrafluoroethylene and hexafluoropropylene, polyethylene, and polypropylene, or the like. Tube 32 is hollow in the center and receives a metal or carbon electrode 39 having a face section 40 contacting the electrolyte which operates as the sensor and anode and which is spaced a capillary distance from the membrane 20 and which is not polarized in the presence of the material being measured. The annular space 38 between the supporting body 12 and the permeable plastic tube 32 is filled with air or oxygen which permits diffusion of the oxygen through face 33 into the enzyme layer 35. With the structure of the electrode shown in FIG. 2, an external reference electrode or cathode is used and placed in the solution being measured. A cell pair using the sensor structure shown in FIG. 2 and a separate reference electrode may be used since the membrane 20 is electrically conductive because of passage of ions therethrough, and the solution being tested itself provides the electrolyte which electrically interconnects the anode and the cathode, or an electrolyte may be added to the solution being tested.

Referring to FIGS. 3 and 4, an electrode structure is shown including an electrically insulating support member 42 which is preferably in the form of a hollow cylindrical tube. Positioned within the support member 42 is an electrically insulating member 42 which is preferably hollow and which receives a cylindrical platinum anode electrode 44 which is also preferably hollow and filled with air or oxygen. Positioned at the lower end of the anode 44 is a thin oxygen permeable wafer 45 which permits passage of oxygen from the internal portion of the hollow anode 44 into the enzyme-electrolyte mixture 26 while preventing enzyme from entering the hollow or internal portion of the anode 44. The active face or surface of the anode is the annular exposed face 46 which contacts the electrolyte mixture 26 and is spaced a capillary distance from the membrane 20. Also positioned in the annular space 25 between support member 42 and tube 43 is a cathode 47 which contacts the electrolyte-enzyme mixture 26. The electrode structure shown in FIGS. 3 and 4 also includes a permeable membrane 20 and top cap structure 14 as previously described in connection with FIGS. 1 and 2, and the electrodes include lead wires which have not been numbered.

The cell structure shown in FIG. 5 is basically the same as that shown in FIG. 2 and where applicable, common reference numerals have been employed. In this particular form of electrode, the space between the plastic tube 32 and the supporting body 12 is filled with a solution 50 of sodium phosphate or dilute sulphuric acid so that the cell itself may generate oxygen. Electrode 51 is an anode and generates oxygen when a voltage of about 1.3 volts is applied between it and a cathode 52. The cathode 52 is immersed in the phosphate or sulphuric acid electrolyte 50 and positioned in spaced relation to the anode 51, with the supporting body being provided with a connecting section 53 and an adjoining well section 54. The cathode 52 generates hydrogen which is not needed in the operation of this particular cell, and the hydrogen is permitted to escape through vent 55 provided in the wall of well section 54 above the level of the electrolyte. Excess oxygen escapes through vent 56, and the voltage may be adjusted between electrodes 51 and 52 so that only a minute excess of gases are generated. The electrode pairs 51 and 52 are electrically insulated from any contact with sensor anode 39 which is positioned within the oxygen permeable plastic tube 32. Like the structure shown in FIG. 2, an external reference electrode or cathode is used which is immersed in the solution to be measured. It is preferred in cell structure shown in FIG. 5 that a porous plug 58 be used to prevent back flow of the generated hydrogen from the cathode 52 to the anode 51. By using a porous plug, the electrical path between the anode and cathode is maintained by the electrolyte which is in contact with both of these electrodes.

There are conditions in the use of the cell wherein there may be present interfering substances, for example, if blood containing ascorbic acid were tested for glucose, the ascorbic acid, being a low molecular weight material, would diffuse through the membrane and would depolarize the anode of the cell and adversely affect the accuracy of the reading even in the absence of an enzyme in the electrolyte. In accordance with the present invention, the possible interference of ascorbic acid or other interfering materials is compensated for by using a cell which is sensitive to the interfering material and a cell which is sensitive both to the material being measured and the interfering material, for example, the ascorbic acid and glucose. Then by electrically subtracting the current representative of the ascorbic acid from the current representative of the combined ascorbic acid and glucose, the amount of glucose may be indicated directly.

A typical schematic system to illustrate the above system is shown in FIG. 6 which includes a galvanometer 60 and two polarographic cells A and B. The A cell does not include the enzyme and is responsive only to ascorbic acid, the B cell is responsive both to the ascorbic acid and glucose. Each cell is provided with its own potential source 61 and 62, respectively. By exposing a blood sample only to cell A, the meter 60 will indicate the percentage of ascorbic acid by swinging into the range indicated at A on the meter. If the sample is exposed only to cell B, the meter will indicate the combined percentage of ascorbic acid and glucose by swinging into the range B on the meter. If the blood sample is exposed to both the A and B cells, the meter will read glucose content only. In this system, the ascorbic acid current causes the needle to swing in a direction opposite to that caused by the combined ascorbic acid and glucose, and full scale response time may be as low as one minute by using a thin membrane and a thin layer of enzyme and electrolyte as shown for example in the structure of FIGS. 2 and 5.

Tests with the electrode pair have indicated that when the current flow is subtracted in this way, increasing amounts of glucose added to the blood will increase the current flowing while increasing amounts of ascorbic acid will not produce any effect. If desired, the current from the nonenzyme electrode can be registered and used as a measure of blood ascorbic acid.

It has been found that in a typical arrangement one will obtain a current flow of about 1.0 microampere from a normal blood glucose and less than 0.05 microampere from the ascorbic acid and that these can be subtracted electrically to give an accurate reading for blood glucose. In many practical operations in industry where it is known that there are no other polarographically active substances present, a compensating electrode would not be required.

The nonenzyme electrode current, or the compensating current can also be read on a meter at the same time it is compensating the enzyme electrode current so that knowledge of other abnormal conditions can be obtained. For example, certain sulfa drugs could cause such a current, or a high blood iodide level (as may be found in iodide poisoning), or an abnormally high level of ascorbic acid, etc. While the compensating electrode, as used here would not indicate exactly what was abnormally high it would give a warning of an abnormal situation in the blood or an industrial product, which would require further examination.

Referring to FIG. 7, an electrical system schematically illustrated which is designed for automatic subtraction of the current representative of the interfering material. This system includes cells A and B and a potential source 65 with a galvanometer 66 and resistors 67. In this embodiment, both cells must be in contact with samples being tested, and the meter indicates the glucose content directly as an indication of the percentage of glucose.

Since the activity of the enzymes and the operation of the cell is affected by temperature, it is preferable that the cells and samples be temperature stabilized or that compensation be made electrically for variations in temperature.

Various preservatives may be added to the enzyme solutions so as to prevent their bacterial putrefaction, or the electrode can be prepared in a sterile fashion. Bacteria cannot contaminate the electrode by entry through the membrane for the pores are too small. Propyleneglycol, penicillin, chlorobutanol and benzoic acid may be used as preservatives since they are polarographically inactive under the conditions given. Glucose oxidase tends to be self-sterilizing and was, in fact, originally isolated as an antibiotic called notatin.

The electrode can be used in unique ways for special applications, for example, in the pharmaceutical industry where "psychic energizers" are being tested. Many amine oxidase inhibitors are psychic energizers, and to test the activity, the electrode would be prepared with an electrolyte containing monoamine oxidase and placed in a solution of a standard common amine, such as tyramine and a current flow, as described above would be obtained. If an amine oxidase inhibitor were added (usually as an unknown) to the tyramine the current flow would immediately decline.

The oxidase, like certain other enzymes, can be protected from oxidation, as by the formed hydrogen peroxide, by the addition of certain substances. The substances which are acceptable for this purpose are nondialyzable otherwise they would be lost through the membranes. A typical such substance is gelatin which is known to protect enzymes from peroxide oxidation and which, being a protein, is nondialyzable.

Since the ions in the unknown fluid rapidly exchange with those on the electrode side of the membrane it may be necessary in the analysis of some fluids to dilute them in a controlled way (e.g., 50% unknown, 50% buffer) with a buffer, or to add a small amount of concentrated buffer to the unknown. Excellent results are obtained for blood glucose if blood is diluted 50/50 with a phosphate buffer before placing in contact with the electrode.

In those cases where the sample is diluted it is sometimes possible to add reagents which will render inactive certain interfering substances. For example, copper-treated charcoal powder destroys ascorbic acid, and enzymes found in cucumber converts ascorbic acid in blood to dehydroascorbic acid, the latter being polarographically inactive at an anode.

Generally, enzymes are stable in a dry form or in solution if kept cold or frozen. Fresh solutions may be added to the electrode depending on the stability of the enzyme. Specific mention has been made of oxidases and anodic determination of peroxide, but the invention may be used where an enzyme, or even inorganic catalysts, converts a diffusable polarographically inert substance into a polarographically active substance. Mixtures of enzymes can be used simultaneously where more than one reaction is required to convert the unknown to be measured into a polarographically active product. One enzyme, continuously converts the unknown A to substance B, another enzyme converts B to C, where only C depolarizes the anode.

Because anodes are insensitive (are not depolarized by oxygen) to oxygen they are generally most easily used, but cathodes can be used in a similar manner with a cellophane membrane, by incorporating glucose oxidase and catalase into the electrolyte, and adding glucose to the unknown solution where the oxygen is used up before the solution reaches the platinum surface. Addition of enzymes that produce cathodically active products results in an electrode that is sensitive to these substances. Similar nonenzyme (but glucose oxidase-catalase containing) compensating electrodes may be used. The great specificity of enzymes allows them generally to be mixed in this way without the enzymes interacting with each other.

Cathodes containing the specific "measuring" enzymes may, of course, also be used without the glucose oxidase-catalase, by deoxygenating the solution to be analyzed by bubbling it with nitrogen or other inert gases.

Another means of holding enzymes in a thin film directly between the platinum surface and the membrane, aside from capillary action, is to place the enzyme on a porous film, such as "Millipore," which has spaces large enough to hold enzyme or protein molecules. This may be desirable where, as a convenience, the enzyme may be dried on circular porous disks and used to charge the electrode.

Some enzymes are stabilized by, and retain their activity on, various solid polymeric gels, such as dextran, and these may be used in the cell. Peptides and the like stabilize some enzymes and these may be added to the electrolyte.

By placing the inner chamber of the electrode under a somewhat negative pressure (e.g., 5 inches of mercury suction), it is possible to speed the passage of the diffusable components into the space in front of the platinum electrode and thus increase the speed of response where a very rapidly responding system is required. The electrode construction shown in FIG. 3 could be used for this by placing a suction on the interior of the anode 44. Fluid would be drawn past the active surface of the electrode and some enzyme (an excess in terms of activity) would be drawn along simultaneously. The inner surface of electrode 44 would be insulated electrically so that only those chemical reactions occurring between the platinum surface and the cellulose or porous membrane would be detected.

Another form of cell and polarographic apparatus in accordance with the present invention includes at least one electrode of pyrolytic graphite, a relatively new material in which there is an oriented arrangement of crystals which may be described as stacked sheets. This type material is spectroscopically pure and made from the combustion of gaseous materials under controlled conditions. The crystal structure includes an "a plane" which is that normal to the plane of the crystals or sheets and a plane referred to as the "b–c plane" which is parallel to the crystals or sheets. I have found that the a-plane is impermeable to most materials while the b–c plane permits entry of liquid materials.

In accordance with the present invention, pyrolytic graphite may be used as one or more of the electrodes of the cell with the pyrolytic graphite electrode disposed in the cell so that the a-plane is exposed to the electrolyte while the b–c plane is sealed therefrom. This may be accomplished by mounting the electrode in a fluid impermeable material such as an epoxy resin or the like so that a fluid impermeable barrier is formed which completely seals the b–c plane. Since pyrolitic graphite fractures clean and easily parallel to the a-plane, once the electrode is covered with epoxy resin, it may be cut to any convenient length.

In a simple form, the cell using a pyrolytic graphite electrode may take the form shown in FIG. 1 wherein electrode 16 is pyrolytic graphite with the a-plane exposed and in contact with the electrolyte and supporting member 15 being epoxy resin or any other suitable material supporting the electrode, the b–c plane being rendered fluid impervious as previously mentioned. A lead wire such as 18 may be attached in any convenient manner. This particular material as an electrode offers several advantages one of which is that by introducing palladium powder or a palladium salt or palladium oxide into the electrolyte, the pyrolytic graphite electrode behaves as if it were palladium. Similar effects have been observed with other metals or their salts. While the phenomena is not completely understood, voltage and current measurements have led to the above conclusion.

The other advantage of a pyrolytic electrode is that it is relatively simple to provide an electrode system which permits the use of two different potentials, one to measure the interfering substance and the other measuring both the unknown and the interfering substances.

For example, pyrolytic graphite having only the a-plane exposed to solution being tested gives a current flow in the presence of ascorbic acid at only 0.4 volt and at that voltage there is no current flow from the hydrogen peroxide product of the enzymatic conversion process. At about 1.0 volt, however, both the ascorbic acid and hydrogen peroxide produce current. Accordingly, by providing a cell having two pyrolitic graphite anodes behind the membrane and both exposed to these enzymes, and a cathode in contact with the unknown either in the same cell or a different cell, the one electrode kept at a low voltage measures ascorbic acid current, and the other maintained at a higher voltage measures the current of ascorbic acid and hydrogen peroxide. By subtracting the two currents, the cell system indicates the percentage of hydrogen peroxide.

Pyrolytic graphite may also be used as the cathode using nitrous oxide in which case the current at the different voltages would be a subtraction of the oxygen current from the total current. When used as a cathode, pyrolytic graphite cells will not include the enzyme.

Another form of electrode system for measurement of nitrous oxide and oxygen includes two cathodes and a reference electrode or anode. For example, palladium gives a current at 0.3 volt for oxygen but not nitrous oxide. A gold cathode gives a current at 0.8 volt for oxygen but not nitrous oxide. Both gold and palladium, however, give a current for both oxygen and nitrous oxide at about 0.6 volt. Thus, by providing a cell system using two cathodes of the same material, for example palladium, and a common anode or reference electrode, then one cathode is set at one potential (e.g., 0.3 volt for palladium) to measure oxygen and the other cathode is set at another potential (e.g., 0.6 volt for palladium) to measure both oxygen and nitrous oxide.

By connecting these electrodes into a circuit which includes a sensitivity adjustment, potential source, switch and meters, the sensitivity if adjusted so that the oxygen current of one electrode (A) is equal to the oxygen current of the other (B). This may be done by exposing both electrodes to oxygen. By closing the switch, the oxygen current of the (A) is in opposition to the oxygen current of (B) and this may be checked by again exposing both electrodes to oxygen. If the sensitivity is properly adjusted, there should be no current. If both electrodes are exposed to nitrous oxide and the current of B cell less the A cell is amplified, a reading will be produced. Then in use, the one meter on the A electrode provides a reading for oxygen while the meter providing the B current less the A current provides a reading of nitrous oxide.

Referring to FIG. 8, an apparatus is shown in accordance with the present invention by which the subtraction of one voltage from another may be accomplished. The apparatus 70 includes polarographic cells A and B with their respective potential sources 72 and 73. The output of each of these cells is connected to a circuit of the type shown in FIG. 8 which includes a galvanometer 75 which will indicate the current of A, or B, or A subtracted from B. The panel 76 includes an actuator switch 79 which can be used to form a zero check, a reading of A, a reading of B or a subtraction of the current of A from B as noted on the face of the panel. Also, the apparatus includes means 81 and 82 to adjust the sensitivity of cells A and B, respectively. The interior circuit of the apparatus 70 is well known and may be of the type described in FIG. 7 with modifications to provide sensitivity adjustment and the various refinements of zero adjustment as previously noted. The operation of such an apparatus has been described previously in connection with the measurement of nitrous oxide and oxygen.

Another system for use in measurement of nitrous oxide involves the use of palladium and platinum as cathodes and a silver/silver chloride anode. The platinum cathode measures both oxygen and nitrous oxide at 0.6 volt while at the same voltage a platinum cathode measures only oxygen. In the case of this electrode system and those previously mentioned, the membrane may be polytetrafluoroethylene, fluorinated ethylene propylene, polyethylene, polypropylene or silicone rubber. As noted previously, in the case of a palladium electrode, a pyrolytic graphite electrode and palladium powder or a salt thereof in the electrolyte may be used. Such electrode systems as those previously described may be used in anesthesiology for monitoring the amount of nitrous oxide and oxygen.

By the present invention a compensated electrode system has been provided which extends the scope of materials which may be analyzed polarographically. The compensation by polarographic mehods offers the advantage of eliminating or substantially reducing preliminary separation of a sample to remove therefrom the interferring substance. Also, by the compensation techniques herein disclosed, it is possible to determine whether there is any interfering material present and the amount thereof thereby providing a warning of any abnormal condition which may require further investigation.

While one feature of the present invention has been described using an analysis of blood to determine the glucose content thereof as an example, it will be apparent to those skilled in the art that the invention finds application in the polarographic analysis of any material which may be enzymatically converted to a polarographically active material. The advantage of the polarographic analysis procedure described in accordance with the present invention is the specificity with which the presence and the percentage of various materials may be determined. For example, an unknown sample containing glucose, maltose, lactose, raffinose, di-amino acid, soluble starches and the like may be analyzed for each of these components by providing a series of polarographic cells whose response is determined by the enzyme used therein. Thus, by sequentially treating a sample, or aliquots of a sample, using different electrode systems with different enzymes, an analysis may be made rapidly and efficiently.

The present invention also offers the advantage of being able to distinguish one carbohydrate from aonther rather rapidly. For example, the usual procedures for the analysis of sugars such as sucrose, glucose, and fructose are somewhat involved particularly if the analysis is polarimetry that is, determination of the optical rotation of plane-polarized light by the various sugars. The present invention vastly simplifies the analysis because of the specificity of the enzymes as well as the accuracy and speed of the polarographic cell. The analysis for sugars may be made in various carrier liquids, and any aqueous carrier liquid may be used.

The aspect of the present invention which is of considerable importance is the use of a compensating cell which provides an indication of the presence and amount of interfering materials so that erroneous indications are not given. The polarographic measurement of various materials, particularly, for sugars in the presence of blood or urine, is far simpler than methods by which oxygen content or pH changes are determined particularly in the case of buffered solutions whose pH may not be readily changed. Similarly the compensating electrode may provide an indication of some abnormal condititon as previously discussed.

The present invention is applicable in the medical as well as industrial fields for analysis for various components as previously described.

While the forms of apparatus and the methods herein described, constitute preferred embodiments of the invention, it is to be understood that the invention is not limited to these precise forms of apparatus and these methods, and that changes may be made therein without departing from the scope of the invention.

What is claimed is:

1. Apparatus for polarographic analysis of a polarographically inactive unknown wherein the sample being analyzed includes both the unknown and an interfering polarographically active material, comprising means forming a first polarographic electrode system, means forming a second polarographic electrode system, each said electrode system including at least one electrode positioned behind a membrane permeable to the unknown and impermeable to enzymes, means providing a source of potential for said electrode systems, said first electrode system including at least one enzyme in a capillary thin layer between the electrode and the membrane for conversion of said unknown to produce ultimately a polarographically active material and being responsive both to said conversion product and the interfering material, said second electrode system being responsive to the interfering material in the unknown, and means connected to said first and second electrode systems for indicating the current of the respective electrode systems whereby the current from said second electrode system may be subtracted from the current of said first electrode system to provide a current representative of the polarographically active conversion product and thus the unknown.

2. An apparatus as set forth in claim 1 wherein said first electrode system includes more than one enzyme for conversion of said unknown through at least two reactions ultimately to produce hydrogen peroxide.

3. An apparatus as set forth in claim 1 wherein each electrode system includes a pair of electrodes on the same side of the corresponding membrane.

4. Apparatus for polarographic analysis of a polarographically inactive unknown wherein the sample being analyzed includes both the unknown and an interfering polarographically active material, comprising means forming a first polarographic electrode system, means forming a second polarographic electrode system, means providing a source of potential for said electrode systems, said first electrode system including an enzyme for conversion of at least a portion of said unknown to produce hydrogen peroxide, said first electrode system being responsive at one voltage both to said hydrogen peroxide and the interfering material, said second electrode system being responsive at a second voltage different from said first to the interfering material in the unknown, and means connected to said first and second electrode systems for indicating the current of the respective electrode systems whereby the current from said second electrode system may be subtracted from the current of said first electrode system to provide a current representative of the hydrogen peroxide and thus of the unknown.

5. Apparatus for polarographic analysis of an unknown wherein the sample being analyzed includes both the unknown and an interfering polarographically active material, comprising means including a pyrolytic graphite anode forming a first polarographic electrode system, means including a second pyrolytic graphite anode forming a second polarographic electrode system, means providing a source of potential for said electrode systems, said first electrode sytem being responsive at a first voltage both to the unknown and the interfering material, said second electrode system being responsive at a second voltage different from said first to the interfering material in the unknown, and means connected to said first and second electrode systems for indicating the current of the respective electrode systems whereby the current from said second electrode system may be subtracted from the current of said first electrode system to provide a current representative of the unknown.

6. Apparatus for polarographic analysis of carbohydrates wherein the sample being analyzed includes both the carbohydrates and polarographically active interfering material, comprising means forming a first polarographic electrode system, means forming a second polarographic electrode system, said first named means including an enzyme for conversion of the carbohydrate to produce a polarographically active material, each said electrode system including membrane means for passage of at least a portion of said carbohydrate and said interfering material in said sample, means providing a source of potential for said electrode systems, said first electrode system being responsive both to the polarographically active material and the interfering material, said second electrode system being responsive to the interfering material in the unknown, and means connected to said first and second electrode systems for indicating the current of the respective electrode systems whereby the current from said second electrode system may be subtracted from the current of said first electrode system to provide a current representative of the polarographically active material as an indication representative of the carbohydrate.

7. Apparatus as set forth in claim 6 in which said enzyme consists of an apoenzyme and a coenzyme.

8. Apparatus for polarographic analysis of a polarographically inactive unknown wherein the sample being analyzed includes both the unknown and an interfering polarographically active material, comprising a first and second polarographic system, each system including at least a platinum polarographic anode, an electrolyte contacting said anode, and permeable membrane means for each system permitting passage of the polarographically active and inactive materials therethrough for contact with said electrolyte and said anode, each said electrode system including a reference cathode electrically connected through an electrolyte to the corresponding anode, the first system including an enzyme material in said electrolyte for converting at least a portion of the polarographically inactive material on the anode side of said first system to produce hydrogen peroxide, means providing a source of potential for said systems, said first system being responsive both to the formed hydrogen peroxide and the interfering material, said second electrode system being responsive to the interfering material in the unknown, and means connected to said first and second systems for indicating the current of the respective systems whereby the current from said second system may be subtracted from the current of said first system to provide a current representative of the hydrogen peroxide as an indication representative of the polarographically inactive unknown.

9. Apparatus as set forth in claim 8 wherein said enzyme material is selected from the group consisting of glucose oxidase, galactoxidase, ascorbic acid oxidase, l-amino acid oxidase, d-amino acid oxidase, xanthine oxidase and uric acid oxidase.

10. An apparatus as set forth in claim 8 wherein said enzyme material includes a material selected from the group consisting of coenzymes and enzyme activator.

11. An apparatus as set forth in claim 10 wherein said enzyme material includes a nonlabile coenzyme bound to said enzyme material to form a protein moiety.

12. An apparatus as set forth in claim 8 wherein said enzyme material includes a non-dialyzable material preventing oxidation of said enzyme material.

13. Apparatus for polarographic analysis of glucose in blood wherein the sample being analyzed includes both glucose and ascorbic acid, comprising means forming a first polarographic electrode system, means forming a second polarographic electrode system, means providing a source of potential for said electrode systems, enzyme means cooperating with said first system for the conversion of glucose to produce a polarographically active material, said first electrode system being responsive both to the polarographically active material and to ascorbic acid, said second electrode system being responsive to ascorbic acid in the unknown, and means connected to said first and second electrode systems for indicating the current of the respective electrode systems whereby the current from said second electrode system may be subtracted from the current of said first electrode system to provide a current representative of the polarographically active material as an indication representative of the percentage of glucose.

14. Apparatus for polarographic analysis of an unknown wherein the sample being analyzed includes glucose and a polarographically active interfering material, comprising a first and second polarographic electrode cell; each cell including a pair of spaced electrodes, an electrolyte contacting each electrode in each cell, a membrane for each cell permitting passage of the polarographically active and inactive materials therethrough for contact with said electrolyte and electrodes, said first cell including glucose oxidase for enzymatic conversion of glucose of gluconic acid and hydrogen peroxide, the membrane for said first cell being impermeable to glucose oxidase, means providing a source of potential for said cells, said first cell being responsive both to the hydrogen peroxide and the interfering material, said second cell being responsive to the interfering material in the unknown, and means connected to said first and second cell for indicating the current of the respective cells whereby the current from said second cell may be substracted from the current of said first cell to provide a current representative of the hydrogen peroxide product as an indication representative of the amount of glucose.

15. A polarographic cell structure for use in polarographic analysis of an unknown, comprising at least one pyrolytic graphite electrode element wherein said graphite includes an "a plane," means supporting said electrode so that a surface thereof parallel to the "a plane" is exposed, a membrane spaced a relatively small distance from said surface to define therebetween a space of capillary dimensions, said space including an electrolyte in contact with said surface of said electrode, said membrane being permeable to at least the unknown, said electrolyte having disposed therein palladium powder, palladium oxide or a palladium salt, and wherein said electrode responds polarographically similar to an electrode of said powder, said oxide or said salt.

16. A polarographic cell structure for use in polarographic analysis comprising electrically insulating support means, electrode means including a working face positioned within said support means, a membrane spaced a relatively small distance from said working face and defining a space therebetween of capillary dimensions, said space being filled with an electrolyte and an enzyme, said enzyme converting the unknown to a polarographically active material, means defining an oxygen permeable member positioned within said support means permitting passage of oxygen into said electrolyte and enzyme, and said membrane being permeable to the unknown being analyzed.

17. A polarographic cell structure as set forth in claim 16 wherein said oxygen permeable member supports said electrode means.

18. A polarographic cell structure as set forth in claim 16 including means in said cell for electrochemically generating oxygen.

19. A method for polarographic analysis of nitrous oxide wherein the sample being analyzed includes both nitrous oxide and oxygen, said method comprising the steps of providing a first electrode system with a first potential across the electrodes thereof for providing a first current output representative of both said nitrous oxide and oxygen, providing a second electrode system with a second potential different from said first across the electrodes thereof for providing a second current output representative oxygen, contacting said sample with said first and second electrode systems for providing said first and second currents and subtracting said second current from said first to provide a current representative of nitrous oxide concentration.

20. A method for the quantitative polarographis determination of a polarographically inactive material which is convertible by at least one enzyme to produce ultimately hydrogen peroxide, comprising the steps of providing a polarographic cell including at least one electrode positioned behind a membrane permeable to the material being measured and in contact with an electrolyte containing an enzyme which reacts with said inactive material to produce hydrogen peroxide, establishing a potential across said cell such that a current is produced which is proportional to the amount of hydrogen peroxide present on the electrode side of said membrane, bringing said cell into contact with a quantity of material containing said inactive material to effect diffusion of at least a portion thereof through said membrane, said enzyme being effective to convert said inactive material to produce hydrogen peroxide, and determining the current flowing across said cell as a function of the amount of hydrogen peroxide formed and as an indication of the amount of said inactive material present in said quantity of material.

21. A method as set forth in claim 20 wherein said enzyme is selected from the group consisting of glucose oxidase, galactoxidase ascorbic acid oxidase, 1-amino acid oxidase, d-amino acid oxidase, xanthine oxidase and uric acid oxidase.

22. The method as set forth in claim 20 wherein said inactive material is glucose and wherein said enzyme glucose oxidase.

23. The method as set forth in claim 20 wherein said inactive material is selected from the group consisting of ascorbic acid, glucose, 1-amino acid, d-amino acid, xanthine, galactose and uric acid, and wherein said enzyme is selected from the group consisting of ascorbic acid oxidase, glucose oxidase, 1-amino acid oxidase, d-amino acid oxidase, xanthine oxidase, galactoxidase and uric acid oxidase, respectively.

24. A polarographic cell structure for use in polarographic analysis of an unknown, comprising electrically insulating support means, a pair of electrodes mounted in said support means, at least one of said electrodes being a pyrolytic graphite electrode wherein said graphite includes an "$a$ plane" and a "$b$–$c$ plane," each said electrode including means defining an active exposed working face, said pyrolytic graphite electrode being so supported by said support means that a surface parallel to said "$a$ plane" constitutes the working face thereof, membrane means spaced a relatively small distance from said working face of said electrodes to define a space therebetween of capillary dimensions, said space including an electrolyte in contact with each said electrode, enzyme means in said electrolyte for converting said unknown to a polarographically active material, said electrodes being responsive to said polarographically active material, and said membrane means being permeable to at least the unknown being detected.

25. A method of polarographically analyzing a material for a polarographically inactive unknown wherein the sample being analyzed includes both the unknown material and an interfering polarographically active material comprising the steps of polarographically detecting the interfering polarographic material to produce a current representative thereof, enzymatically converting the inactive unknown to produce polarographically active material, polarographically detecting both the produced polarographically active material and the interfering polarographically active material to produce a current representative of both materials, and subtracting one current from the other to produce a current representative of the produced polarographically active material as a function of the amount of the inactive unknown.

26. A method as set forth in claim 25 wherein said conversion is by the action of at least one enzyme.

27. A method as set forth in claim 26 wherein said unknown is a carbohydrate.

28. A method as set forth in claim 26 wherein said unknown is glucose and said interfering material is ascorbic acid, and said glucose being enzymatically converted to a polarographically detectable material.

29. A method as set forth in claim 25 wherein the step of polarographically detecting said materials is accomplished by a polarographic cell system including electrode means responsive at one voltage to both materials and responsive at another voltage to said interfering material.

30. A method as set forth in claim 25 wherein the step of polarographically detecting said materials is accomplished by a polarographic cell system including at least one pyrolytic graphite electrode.

31. A method as set forth in claim 25 wherein said unknown material is enzymatically converted to a conversion product and hydrogen peroxide, and wherein said hydrogen peroxide is polarographically detected to provide a current representative of the unknown material.

32. A polarographic cell structure for use in polarographic analysis of an unknown, comprising electrically insulating support means, electrode means mounted in said support means, said electrode means including means defining an active exposed working face, membrane means spaced a relatively small distance from said working face of said electrode means to define a space therebetween of capillary dimensions, said space including an electrolyte in contact with said electrode means, enzyme means in said electrolyte for converting said unknown to produce a polarographically active material, said electrode means being responsive to said polarographically active material, said membrane means being permeable at least to the unknown being detected, and external means associated with said cell for creating a pressure differential across said membrane to speed passage of the unknown therethrough.

33. A method for polarographic analysis of a polarographically inactive unknown wherein the sample being analyzed includes both the unknown and an interfering polarographically active material, comprising the steps of providing a first polarographic electrode system, providing a second polarographic electrode system, said first electrode system including an enzyme for conversion of at least a portion of said unknown to produce hydrogen peroxide, said first electrode system being responsive both to said hydrogen peroxide and the interfering material, said second electrode system being responsive to the interfering material in the unknown, establishing a potential across said first electrode system such that a first current is produced which is proportional to the amount of hydrogen peroxide and the interfering material, establishing a potential across said second electrode system to produce a second current which is proportional to said interfering material, bringing said cell systems into contact with said unknown to produce said currents, and subtracting said second current from said first current to provide a current representative of the hydrogen peroxide and thus of the unknown.

34. A method for polarographic analysis of glucose in blood wherein the sample being analyzed includes both glucose and ascorbic acid, comprising the steps of providing a first polarographic electrode system, providing a second polarographic electrode system, providing a source of potential for said electrode systems, said first cell including enzyme means for the conversion of glucose to produce a polarographically active material, said first electrode system being responsive both to the polarographically active material and to ascorbic acid, said second electrode system being responsive to ascorbic acid in the unknown, bringing said sample into contact with both said first and second electrode systems, and measuring the current of the respective electrode systems whereby the current from said second electrode system may be subtracted from the current of said first electrode system to provide a current representative of the polarographically active material as an indication representative of the percentage of glucose.

35. A method for polarographic analysis of nitrous oxide wherein the sample being analyzed includes both nitrous oxide and oxygen, comprising the steps of forming a first polarographic electrode system, forming a second polarographic electrode system, each said electrode system including a cathode of the same material selected from the group consisting of palladium and gold, providing a source of potential for said electrode systems, said first electrode system being responsive at a first voltage both to nitrous oxide and oxygen, said second electrode system being responsive at a second voltage to oxygen, bringing said sample into contact with said electrode systems, and measuring the current of the respective electrode systems whereby the current from said second electrode system may be subtracted from the current of said first electrode system to provide a current representative of nitrous oxide concentration.

References Cited

UNITED STATES PATENTS

| | | | |
|---|---|---|---|
| 2,805,191 | 9/1957 | Hersch | 204—1.1 |
| 2,851,654 | 9/1958 | Haddad | 204—195 |
| 2,913,386 | 11/1959 | Clark | 204—195 |
| 3,208,926 | 9/1965 | Eckfeldt | 204—195 |
| 3,275,534 | 9/1966 | Cannon et al. | 204—1.1 |
| 3,294,652 | 12/1966 | Banks et al. | 204—195 |
| 3,296,113 | 1/1967 | Hansen | 204—195 |
| 3,334,039 | 8/1967 | Vlasak | 204—195 |
| 3,367,849 | 2/1968 | Blaedel et al. | 204—1.1 |
| 3,479,255 | 11/1969 | Arthur | 204—195 |

OTHER REFERENCES

Bladel et al.: "Analytical Chemistry," vol. 34, No. 3, March 1962, pp. 388–394.

Clark: "Ala. J. Med. Sci.," vol. 1, No. 2, 1964, pp. 142–148.

Clark et al.: "Reprint from Annals of the New York Academy of Science," vol. 102, art. 1, pp. 39–45, Oct. 31, 1962.

TA HSUNG TUNG, Primary Examiner

U.S. Cl. X.R.

204—195